United States Patent
Teng et al.

(10) Patent No.: US 12,248,786 B2
(45) Date of Patent: Mar. 11, 2025

(54) INSTRUCTION SET ARCHITECTURE FOR DATA PROCESSING ARRAY CONTROL

(71) Applicant: Xilinx, Inc., San Jose, CA (US)

(72) Inventors: Xiao Teng, Cupertino, CA (US); Tejus Siddagangaiah, Santa Clara, CA (US); Bryan Lozano, San Jose, CA (US); Ehsan Ghasemi, San Jose, CA (US); Rajeev Patwari, San Jose, CA (US); Elliott Delaye, San Jose, CA (US); Jorn Tuyls, Leinster (IE); Aaron Ng, San Jose, CA (US); Sanket Pandit, San Jose, CA (US); Pramod Peethambaran, Los Gatos, CA (US); Satyaprakash Pareek, Los Gatos, CA (US)

(73) Assignee: Xilinx, Inc., San Jose, CA (US)

( * ) Notice: Subject to any disclaimer, the term of this patent is extended or adjusted under 35 U.S.C. 154(b) by 95 days.

(21) Appl. No.: 17/818,309

(22) Filed: Aug. 8, 2022

(65) Prior Publication Data

US 2024/0045692 A1    Feb. 8, 2024

(51) Int. Cl.
 G06F 9/30    (2018.01)
 G06F 9/38    (2018.01)
 G06F 9/46    (2006.01)

(52) U.S. Cl.
 CPC .......... *G06F 9/3814* (2013.01); *G06F 9/3004* (2013.01); *G06F 9/467* (2013.01)

(58) Field of Classification Search
 CPC ...................................................... G06F 9/30
 See application file for complete search history.

(56) References Cited

U.S. PATENT DOCUMENTS 2,204,687 A    6/1940   Little
3,776,137 A    12/1973  Abbott
(Continued)

FOREIGN PATENT DOCUMENTS

WO    2019195132    10/2019
WO    2019195309    10/2019
WO    2019195343    10/2019

OTHER PUBLICATIONS

Xilinx, Inc., "Xilinx AI Engines and Their Applications," WP506 (v1.1) Jul. 10, 2020, 13 pages.
(Continued)

*Primary Examiner* — Jae U Jeon
(74) *Attorney, Agent, or Firm* — Kevin T. Cuenot (57) ABSTRACT

Controlling a data processing (DP) array includes creating a replica of a register address space of the DP array based on the design and the DP array. A sequence of instructions, including write instructions and read instructions, is received. The write instructions correspond to buffer descriptors specifying runtime data movements for a design for a DP array. The write instructions are converted into transaction instructions and the read instructions are converted into wait instructions based on the replica of the register address space. The transaction instructions and the wait instructions are included in an instruction buffer. The instruction buffer is provided to a microcontroller configured to execute the transaction instructions and the wait instructions to implement the runtime data movements for the design as implemented in the DP array. In another aspect, the instruction buffer is stored in a file for subsequent execution by the microcontroller.

20 Claims, 5 Drawing Sheets

(56) References Cited

U.S. PATENT DOCUMENTS

| | | | |
|---|---|---|---|
| 4,876,641 A | 10/1989 | Cowley | |
| 4,922,352 A * | 5/1990 | Culp | G11B 20/12 |
| 6,091,263 A | 7/2000 | New et al. | |
| 6,150,839 A | 11/2000 | New et al. | |
| 6,204,687 B1 | 3/2001 | Schultz et al. | |
| 6,462,579 B1 | 10/2002 | Camilleri et al. | |
| 6,526,557 B1 | 2/2003 | Young et al. | |
| 6,759,869 B1 | 7/2004 | Young et al. | |
| 6,781,407 B2 | 8/2004 | Schultz | |
| 6,810,514 B1 | 10/2004 | Alfke et al. | |
| 6,836,842 B1 | 12/2004 | Guccione et al. | |
| 6,907,595 B2 | 6/2005 | Curd et al. | |
| 7,024,651 B1 | 4/2006 | Camilleri et al. | |
| 7,057,413 B1 | 6/2006 | Young et al. | |
| 7,124,338 B1 | 10/2006 | Mark et al. | |
| 7,185,309 B1 | 2/2007 | Kulkarni et al. | |
| 7,199,608 B1 | 4/2007 | Trimberger | |
| 7,224,184 B1 | 5/2007 | Levi et al. | |
| 7,281,093 B1 | 10/2007 | Kulkarni et al. | |
| 7,301,822 B1 | 11/2007 | Walstrum, Jr. et al. | |
| 7,302,625 B1 | 11/2007 | Payakapan et al. | |
| 7,454,658 B1 | 1/2008 | Baxter | |
| 7,328,335 B1 | 2/2008 | Sundararajan et al. | |
| 7,380,035 B1 | 5/2008 | Donlin | |
| 7,394,288 B1 | 7/2008 | Agarwal | |
| 7,420,392 B2 | 9/2008 | Schultz et al. | |
| 7,477,072 B1 | 1/2009 | Kao et al. | |
| 7,478,357 B1 | 1/2009 | Mason et al. | |
| 7,482,836 B2 | 1/2009 | Levi et al. | |
| 7,500,060 B1 | 3/2009 | Anderson et al. | |
| 7,509,617 B1 | 3/2009 | Young | |
| 7,518,396 B1 | 4/2009 | Kondapalli et al. | |
| 7,521,961 B1 | 4/2009 | Anderson | |
| 7,539,845 B1 | 5/2009 | Wentzlaff et al. | |
| 7,546,572 B1 | 6/2009 | Ballagh et al. | |
| 7,574,680 B1 | 8/2009 | Kulkarni et al. | |
| 7,576,561 B1 | 8/2009 | Huang | |
| 7,619,442 B1 | 11/2009 | Mason et al. | |
| 7,640,527 B1 | 12/2009 | Dorairaj et al. | |
| 7,650,248 B1 | 1/2010 | Baxter | |
| 7,653,820 B1 | 1/2010 | Trimberger | |
| 7,689,726 B1 | 3/2010 | Sundararajan et al. | |
| 7,724,815 B1 | 5/2010 | Raha et al. | |
| 7,746,099 B1 | 6/2010 | Chan et al. | |
| 7,774,579 B1 | 8/2010 | Wentzlaff | |
| 7,788,625 B1 | 8/2010 | Donlin et al. | |
| 7,831,801 B1 | 11/2010 | Anderson | |
| 8,006,021 B1 | 8/2011 | Li et al. | |
| 8,020,163 B2 | 9/2011 | Nollet et al. | |
| 8,045,546 B1 | 10/2011 | Bao et al. | |
| 8,102,188 B1 | 1/2012 | Chan et al. | |
| 8,214,694 B1 | 7/2012 | McKechnie et al. | |
| 8,250,342 B1 | 8/2012 | Kostamov et al. | |
| 8,359,448 B1 | 1/2013 | Neuendorffer | |
| 8,415,974 B1 | 4/2013 | Lysaght | |
| 8,656,141 B1 | 2/2014 | Agarwal | |
| 8,719,750 B1 | 5/2014 | Balzli, Jr. | |
| 8,796,539 B2 | 8/2014 | Asaumi et al. | |
| 8,928,351 B1 | 1/2015 | Konduru | |
| 9,081,634 B1 | 7/2015 | Simkins et al. | |
| 9,152,794 B1 | 10/2015 | Sanders et al. | |
| 9,165,143 B1 | 10/2015 | Sanders et al. | |
| 9,218,443 B1 | 12/2015 | Styles et al. | |
| 9,230,112 B1 | 1/2016 | Peterson et al. | |
| 9,323,876 B1 | 4/2016 | Lysaght et al. | |
| 9,336,010 B2 | 5/2016 | Kochar et al. | |
| 9,411,688 B1 | 8/2016 | Poolla et al. | |
| 9,436,785 B1 | 9/2016 | Javre | |
| 9,639,487 B1 | 5/2017 | Wentzlaff | |
| 9,652,252 B1 | 5/2017 | Kochar et al. | |
| 9,652,410 B1 | 5/2017 | Schelle et al. | |
| 9,722,613 B1 | 8/2017 | Schultz et al. | |
| 9,990,241 B2 | 6/2018 | Dobbs | |
| 10,243,882 B1 | 3/2019 | Swarbrick | |
| 10,505,548 B1 | 12/2019 | Swarbrick | |
| 10,673,439 B1 | 6/2020 | Ahmad | |
| 10,673,745 B2 | 6/2020 | Swarbrick | |
| 10,747,690 B2 | 8/2020 | Bilski | |
| 10,824,505 B1 | 11/2020 | Swarbrick | |
| 10,824,584 B1 | 11/2020 | Noguera Serra | |
| 10,838,908 B2 | 11/2020 | Swarbrick | |
| 10,866,753 B2 | 12/2020 | Noguera Serra et al. | |
| 10,963,421 B1 | 3/2021 | Swarbrick | |
| 2004/0114609 A1 | 6/2004 | Swarbrick et al. | |
| 2004/0210695 A1 | 10/2004 | Weber et al. | |
| 2007/0006137 A1 | 1/2007 | Savagaonkar | |
| 2007/0124565 A1 | 5/2007 | Jones | |
| 2008/0082759 A1 | 4/2008 | Pong | |
| 2008/0320255 A1 | 12/2008 | Wingard et al. | |
| 2008/0320268 A1 | 12/2008 | Wingard et al. | |
| 2012/0036296 A1 | 2/2012 | Wingard et al. | |
| 2012/0310983 A1 | 12/2012 | Mittal | |
| 2014/0006751 A1 | 1/2014 | Aliseychik et al. | |
| 2014/0136735 A1* | 5/2014 | Polehn | G06F 13/4234 710/22 |
| 2014/0267334 A1 | 9/2014 | Duluk, Jr. | |
| 2015/0205613 A1* | 7/2015 | Bhatia | G06F 9/3814 712/207 |
| 2016/0011996 A1 | 1/2016 | Asaad et al. | |
| 2017/0140800 A1 | 5/2017 | Wingard et al. | |
| 2017/0220499 A1 | 8/2017 | Gray | |
| 2017/0315944 A1 | 11/2017 | Mayer et al. | |
| 2018/0012637 A1 | 1/2018 | Krishna | |
| 2019/0155666 A1 | 5/2019 | Dobbs | |
| 2019/0205263 A1 | 7/2019 | Fleming | |
| 2019/0205269 A1 | 7/2019 | Fleming, Jr. | |
| 2019/0238453 A1 | 8/2019 | Swarbrick et al. | |
| 2019/0266125 A1 | 8/2019 | Swarbrick et al. | |
| 2019/0303033 A1 | 10/2019 | Noguera Serra et al. | |
| 2019/0303311 A1 | 10/2019 | Bilski et al. | |
| 2019/0303323 A1 | 10/2019 | Swarbrick et al. | |
| 2019/0303328 A1 | 10/2019 | Bilski et al. | |
| 2020/0089550 A1* | 3/2020 | Christidis | G06F 9/546 |
| 2021/0157823 A1* | 5/2021 | Liu | G06Q 20/3827 |

OTHER PUBLICATIONS

Xilinx, Inc., "Versal: The First Adaptive Compute Acceleration Platform (ACAP)," WP505 (v1.1.1) Sep. 29, 2020, 21 pages.

* cited by examiner

INSTRUCTION SET ARCHITECTURE FOR DATA PROCESSING ARRAY CONTROL

RESERVATION OF RIGHTS IN COPYRIGHTED MATERIAL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This disclosure relates to controlling a data processing array and, more particularly, to an instruction set architecture for controlling a data processing array.

BACKGROUND

Deep learning refers to a subset of machine learning. To accomplish a given task, deep learning utilizes artificial neural networks. An artificial neural network, or simply a "neural network," includes layers of interconnected nodes that are operable to categorize input data into categories of interest. In general, a neural network will include an input layer, an output layer, and optionally one or more hidden layers between the input and output layers. A neural network expressed as a machine learning model used in deep learning applications typically includes many hidden layers, which gives rise to the term "deep neural network."

A machine learning model may be developed that specifies a particular neural network. The machine learning model may be run on a particular hardware platform to perform inference. Inference refers to calculating an output of the machine learning model given input data. Performing inference involves a high degree of computational intensity and the movement of a significant amount of data through a memory hierarchy of the hardware platform. In some cases, a microcontroller is used to effectuate the data movement. The limited computational capabilities of a microcontroller, however, often leads to scenarios in which performance of the hardware platform is hampered by the inability of the microcontroller to effectively manage data movement throughout the memory hierarchy.

SUMMARY

In one or more example implementations, a method includes creating a replica of a register address space of a data processing array based on a design and the data processing array. The method includes receiving a sequence of instructions including write instructions and read instructions. The write instructions correspond to buffer descriptors specifying runtime data movements for a design for the data processing array. The method includes converting the write instructions into transaction instructions and the read instructions into wait instructions based on the replica of the register address space. The method includes including or adding the transaction instructions and the wait instructions in/to an instruction buffer. The method includes performing at least one of providing the instruction buffer to a microcontroller configured to execute the transaction instructions and the wait instructions to implement the runtime data movements for the design as implemented in the data processing array or storing the instruction buffer to a file for subsequent execution by the microcontroller.

In one or more example implementations, a system includes one or more processors configured to initiate operations. The operations include creating a replica of a register address space of a data processing array based on a design and the data processing array. The operations include receiving a sequence of instructions including write instructions and read instructions. The write instructions correspond to buffer descriptors specifying runtime data movements for a design for the data processing array. The operations include converting the write instructions into transaction instructions and the read instructions into wait instructions based on the replica of the register address space. The operations include including or adding the transaction instructions and the wait instructions in/to an instruction buffer. The operations include performing at least one of providing the instruction buffer to a microcontroller configured to execute the transaction instructions and the wait instructions to implement the runtime data movements for the design as implemented in the data processing array or storing the instruction buffer to a file for subsequent execution by the microcontroller.

In one or more example implementations, a system includes a central processing unit configured to translate a sequence of instructions including write instructions and read instructions into a plurality of transaction instructions and microcontroller wait instructions. The system includes a microcontroller and a data processing array coupled to the microcontroller. The central processing unit is configured to provide the plurality of transaction instructions and wait instructions to the microcontroller. The microcontroller, in response to receiving the plurality of transaction instructions and wait instructions, is configured to execute the plurality of transaction instructions and wait instructions to control data movements into and out from the data processing array.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

This disclosure relates to controlling a data processing array and, more particularly, to an instruction set architecture for controlling a data processing array. The disclosure also relates to generating instructions in a first system that may be played back by a microcontroller to control the data processing array.

In accordance with the inventive arrangements described herein, methods, systems, and computer program products are provided that improve computational performance of a data processing array by offloading selected functions to a central processing unit (CPU) of a host system that would otherwise be performed by a microcontroller of the data processing array. In one or more examples, instruction generation for the microcontroller may be offloaded to the CPU. The CPU is capable of generating instructions that can be executed by the microcontroller in a more computationally efficient manner. The increased efficiency of instruction execution by the microcontroller allows the microcontroller to control data flows into and out from the data processing array more efficiently thereby avoiding bottlenecks in performance of the data processing array that would otherwise be caused by inefficient operation of the microcontroller.

In one aspect, the instruction generation performed by the CPU may be performed at compile time of a design for the data processing array. That is, the instructions generated for consumption by the microcontroller may be generated while the data processing array is offline since the design to be executed by the data processing array is undergoing compilation. The instructions can be saved to a file or otherwise persisted in a memory and provided to the microcontroller at a later time for execution to control operation of the data processing array at runtime.

In another aspect, the instruction generation performed by the CPU is performed at runtime of the design as implemented in the data processing array. That is, the instructions are generated for real-time or near real-time consumption by the microcontroller. The data processing array may be executing a design while the instructions are generated by the CPU and provided to the microcontroller.

In either case, the inventive arrangements contemplate generation of the instructions to be executed by the microcontroller using a different entity such as a CPU. The microcontroller is capable of "playing back" the generated instructions whether in real-time (e.g., or near real-time) or from a file to control operation of the data processing array.

The instructions generated by the CPU may be executed by the microcontroller to configure or program particular data access patterns necessary for correct execution of the design by the data processing array. In one or more examples, the instructions generated by the CPU may include, or be limited to, transaction instructions and wait instructions. These instructions may be used to implement the data movements to execute a neural network (e.g., as specified by the design as implemented in the data processing array). As an illustrative example, any neural network layer that runs on the data processing array will require direct memory access (DMA) circuits of the data processing array to be reconfigured. Given that some neural networks have a significant number of layers (e.g., hundreds), it can be seen that the number of DMA circuit reconfigurations required to execute the neural network may be large. This necessitates the microcontroller used to perform the DMA circuit reconfigurations operate efficiently.

Further aspects of the inventive arrangements are described below with reference to the figures.

Figure 1:
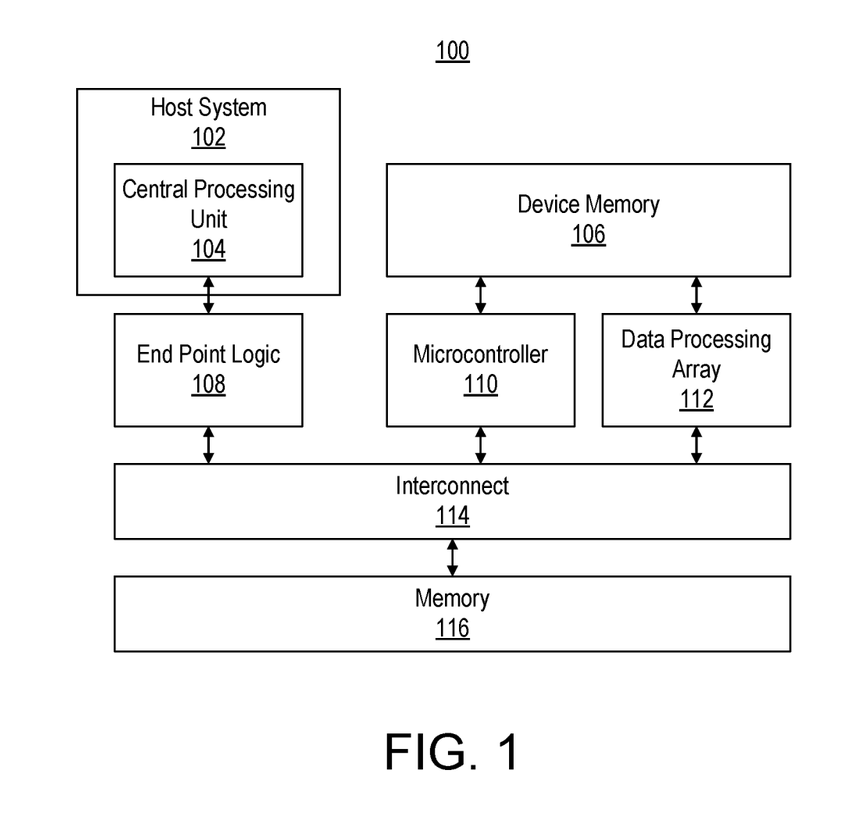
FIG. 1 illustrates an example system for use with the inventive arrangements described herein.

FIG. 1 illustrates an example system 100. System 100 includes a host system 102, a device memory 106, end point logic 108, a microcontroller 110, a data processing array 112, an interconnect 114, and a memory 116. Host system 102 may be implemented as a data processing system (e.g., a computer) and includes a central processing unit (CPU) 104. An example of a data processing system is described herein in connection with FIG. 5.

In the example, CPU 104 is communicatively linked to device memory 106, microcontroller 110, and data processing array 112 by way of end point logic 108. As an illustrative and non-limiting example, CPU 104 may be communicatively linked to end point logic 108 via a communication channel such as a bus. An example communication channel is a peripheral Component Interconnect Express (PCIe) communication link where end point logic 108 is a bus end point such as a PCIe end point. End point logic 108 is communicatively linked with microcontroller 110 and data processing array 112 via interconnect 114. Microcontroller 110 and data processing array 112 are capable of accessing (e.g., reading and/or writing) device memory 106 via data connections and memory 116 via interconnect 114.

In one aspect, end point logic 108, microcontroller 110, data processing array 112, interconnect 114, and memory 116 may be implemented within a single device (e.g., a single integrated circuit). Host system 102 may be coupled to the IC. As an illustrative and non-limiting example, the IC including end point logic 108, microcontroller 110, data processing array 112, interconnect 114, and memory 116 may be disposed on a circuit board that is communicatively linked with host system 102 and CPU 104. In one or more examples, device memory 106 is implemented as a memory that is external to the IC but disposed on the circuit board with the IC. In one or more other examples, device memory 106 is included in the IC. An example of device memory 106 is a Random Access Memory (RAM) such as a Double Data Rate, Synchronous Dynamic Random Access Memory or "DDR memory." In one or more other examples, device memory 106 may be implemented as a high-bandwidth memory. In general, host system 102 is capable of reading and writing device memory 106 to exchange data with the IC.

Memory 116 may represent any of a variety of on-chip RAM memories. Examples of memory 116 may include a Synchronous Dynamic Random Access Memory (SDRAM). More specific examples of memory 116 may include registers, flip-flops, lookup-table memory, block-RAMs, and the like.

Data processing array 112 is implemented as a plurality of hardwired circuit blocks. The plurality of circuit blocks may be programmable. Data processing array 112 may include a plurality of compute tiles, optionally one or more memory tiles, and a plurality of interface tiles organized in an array interface. In general, a compute tile includes a core that has data processing capabilities and a local memory. The local memory can potentially also be accessed by other cores in data processing array 112, subject to constraints. The memory tiles may be used as shared memory accessible by all cores in data processing array 112. An example implementation of data processing array 112 is described in connection with FIG. 2. Data processing array 112 may be programmed to implement one or more operations of a deep neural network.

Figure 2:
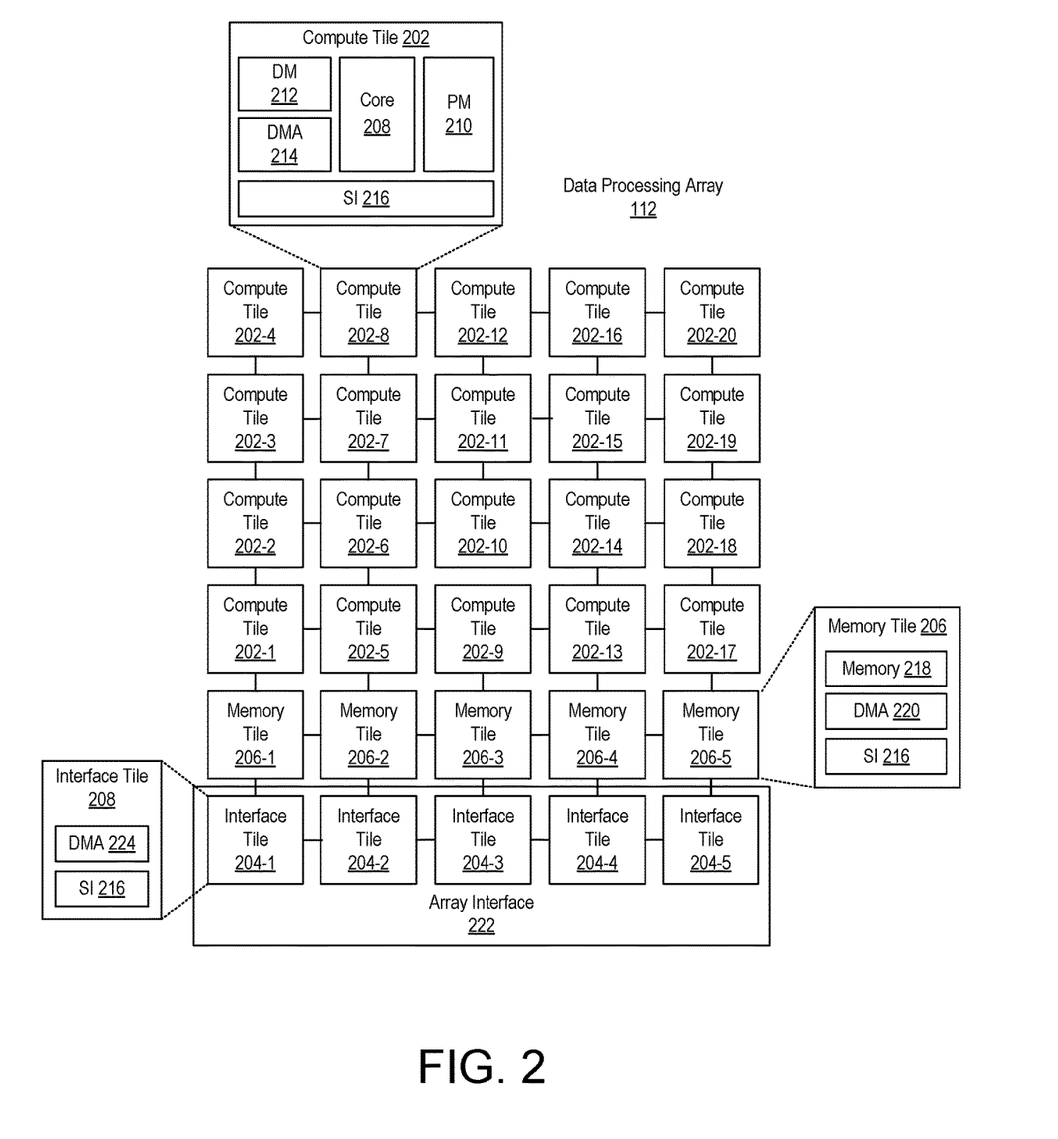
FIG. 2 illustrates an example implementation of a data processing array.

FIG. 2 illustrates an example implementation of data processing array 112. Data processing array 112 may be implemented as a plurality of interconnected tiles. The term "tile," as used herein in connection with a data processing array, means a circuit block. The interconnected tiles of data processing array 112 include compute tiles 202 and interface tiles 204. Data processing array 112 optionally includes one or more memory tiles 206. The tiles illustrated in FIG. 2 may be arranged in an array or grid and are hardwired.

Each compute tile 202 can include one or more cores 208, a program memory (PM) 210, a data memory (DM) 212, a DMA circuit 214, and a stream interconnect (SI) 216. In one aspect, each core 208 is capable of executing program code stored program memory 210. In one aspect, each core 208 may be implemented as a scalar processor, as a vector processor, or as a scalar processor and a vector processor operating in coordination with one another.

In one or more examples, each core 208 is capable of directly accessing the data memory 212 within the same compute tile 202 and the data memory 212 of any other compute tile 202 that is adjacent to the core 208 of the compute tile 202 in the up, down, left, and/or right directions. Core 208 sees data memories 212 within the same tile and in one or more other adjacent compute tiles as a unified region of memory (e.g., as a part of the local memory of the core 208). This facilitates data sharing among different compute tiles 202 in data processing array 112. In other examples, core 208 may be directly connected to data memories 212 in other compute tiles 202.

Cores 208 may be directly connected with adjacent cores 208 via core-to-core cascade connections (not shown). In one aspect, core-to-core cascade connections are unidirectional and direct connections between cores 208. In another aspect, core-to-core cascade connections are bidirectional and direct connections between cores 208. In general, core-to-core cascade connections generally allow the results stored in an accumulation register of a source core 208 to be provided directly to an input of a target or load core 208 without traversing the stream interconnect 216 and/or being written by a first core 208 to data memory 212 to be read by a different core 208.

In an example implementation, compute tiles 202 do not include cache memories. By omitting cache memories, data processing array 112 is capable of achieving predictable, e.g., deterministic, performance. Further, significant processing overhead is avoided since maintaining coherency among cache memories located in different compute tiles 202 is not required. In a further example, cores 208 do not have input interrupts. Thus, cores 208 are capable of operating uninterrupted. Omitting input interrupts to cores 208 also allows data processing array 112 to achieve predictable, e.g., deterministic, performance.

Data processing array 112 may include one or more memory tiles 206. Memory tiles 206 include a memory 218 (e.g., a RAM), a DMA circuit 220, and a stream interconnect 216. Each memory tile 206 may read and/or write to the memory 218 of an adjacent memory tile 206 by way of the DMA included in the memory tile 206. Further, each compute tile 202 in data processing array 112 is capable of reading and writing to any one or more of memory tiles 206. Memory tiles 206 are characterized by the lack of computational components such as processors (e.g., cores 208).

Interface tiles 204 form an array interface 222 for data processing array 112. Array interface 222 operates as an interface that connects tiles of data processing array 112 to other resources of the particular IC in which data processing array 112 is disposed. In the example of FIG. 2, array interface 222 includes a plurality of interface tiles 204 organized in a row. Interface tiles 204 can include a stream interconnect 216 and a DMA circuit 224. Interface tiles 204 are connected so that data may be propagated from one interface tile to another bi-directionally. Each interface tile 204 is capable of operating as an interface for the column of tiles directly above and is capable of interfacing such tiles with components and/or subsystems of the IC including data processing array 112.

Figure 3:
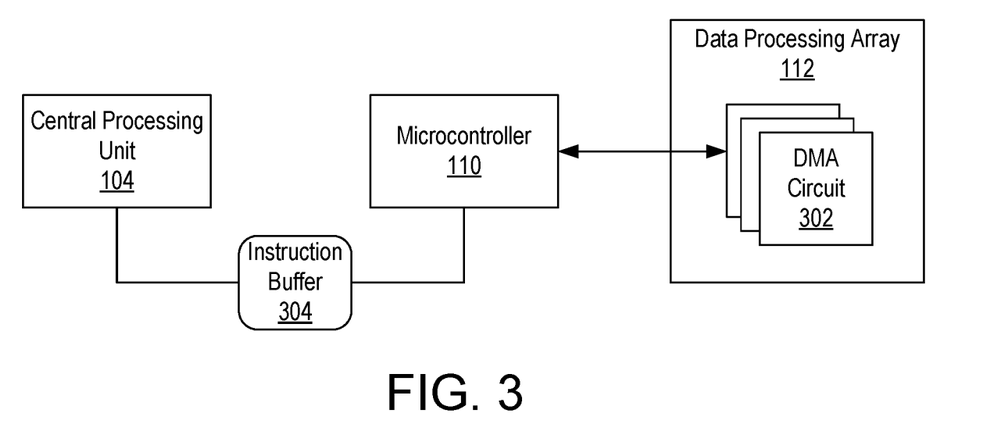
FIG. 3 illustrates example interactions between a central processing unit, a microcontroller, and a data processing array.

FIG. 3 illustrates example interactions between CPU 104, microcontroller 110, and data processing array 112. In the example, data processing array 112 includes a plurality of direct memory access (DMA) DMA circuits 302. The DMA circuits represent DMA circuits 214, 220, and/or 224 of FIG. 2. In the example of FIG. 3, CPU 104 is capable of processing a sequence of instructions that include one or more write instructions and one or more read instructions. The write instructions specify buffer descriptors that are used to program DMA circuits 302 within data processing array 112. The buffer descriptors specify data structures and patterns of data movement into and out from data processing array 112.

By programming DMA circuits 302, microcontroller 110 is capable of controlling operation of data processing array 112. Microcontroller 110 is capable of writing DMA circuit configuration data to the various DMA circuits 302, whether disposed in compute tile(s) 202, interface tile(s) 204, and/or memory tile(s) 206.

As an illustrative and non-limiting example, a design may be created for data processing array 112. The design may be a user created or specified design. The design may be a machine learning application capable of performing inference when executed on data processing array 112. A compiler executing in host system 102 may process the design, which may be specified as a data flow graph including a variety of kernels. The compiler processes the design to generate configuration data that, when loaded into data processing array 112, implements the design therein. The compiler is also capable of generating a plurality of high-level buffer descriptors that describe runtime data movements necessary for the design to execute. The high-level buffer descriptors may be specified in a human-readable format. As such, the buffer descriptors are not in a format that may be provided to the various DMA circuits 302 for configuration thereof.

For purposes of illustration, consider the case where the design includes one or more machine learning layers. A given layer may perform convolution. The compiler is capable of generating a plurality of buffer descriptors that define the data movements necessary for the design, as implemented in data processing array 112, to perform the convolution operations of the convolution layer. The data movement requires the DMA circuits 302 to be configured to coordinate movement of data into data processing array 112 to particular tiles and coordinate the movement of data generated by the data processing array 112 out therefrom.

In accordance with the inventive arrangements described herein, the buffer descriptors, which are generated by the compiler and specified at a high-level, are provided to CPU 104 for processing. CPU 104 is capable of encoding the buffer descriptors into lower-level instructions that may be provided to microcontroller 110 for execution. The encoding of the buffer descriptors performed by CPU 104 enables microcontroller 110 to execute the instructions with greater efficiency. In one aspect, only a limited set of instructions are used and understood by microcontroller 110. In one example, only two different instructions are used and executed by microcontroller 110. This avoids the scenario in which microcontroller 110 induces a bottleneck in performance that may arise where microcontroller 110 is configured to operate with a more complex instruction set architecture that supports more instructions.

In the example, the sequence of instructions is encoded into transaction instructions and wait instructions. The transaction instructions and wait instructions are included in one or more instruction buffers 304. CPU 104 is capable of providing the instruction buffer(s) 304 to microcontroller 110 for playback (e.g., execution). Execution of the transaction instructions by microcontroller 110 effectively programs DMA circuits 302 in data processing array 112 with configuration data that causes the DMA circuits 302 to move data into data processing array 112. Execution of the wait instructions by microcontroller 110 programs DMA circuits 302 in data processing array 112 with configuration data that causes the DMA circuits 302 to read data out from data processing array 112.

As will be described herein in greater detail, in one aspect, instruction buffer(s) 304 may be generated and provided to microcontroller 110 while the design is online. The design is said to be online when the design is executing in data processing array 112. In that case, CPU 104 is capable of serializing instruction buffer(s) 304 and providing the serialized data to microcontroller 110 in real time and/or in near-real time as generated for execution.

In one or more other examples, the instruction buffer(s) 304 may be generated during compile time of the design and stored in a file for later or subsequent playback by microcontroller 110. Since the design is being compiled, the design is offline thereby necessitating the storage of the instruction buffer(s) 304 in a file for later use at a time when the design is executed by data processing array 112.

Figure 4:
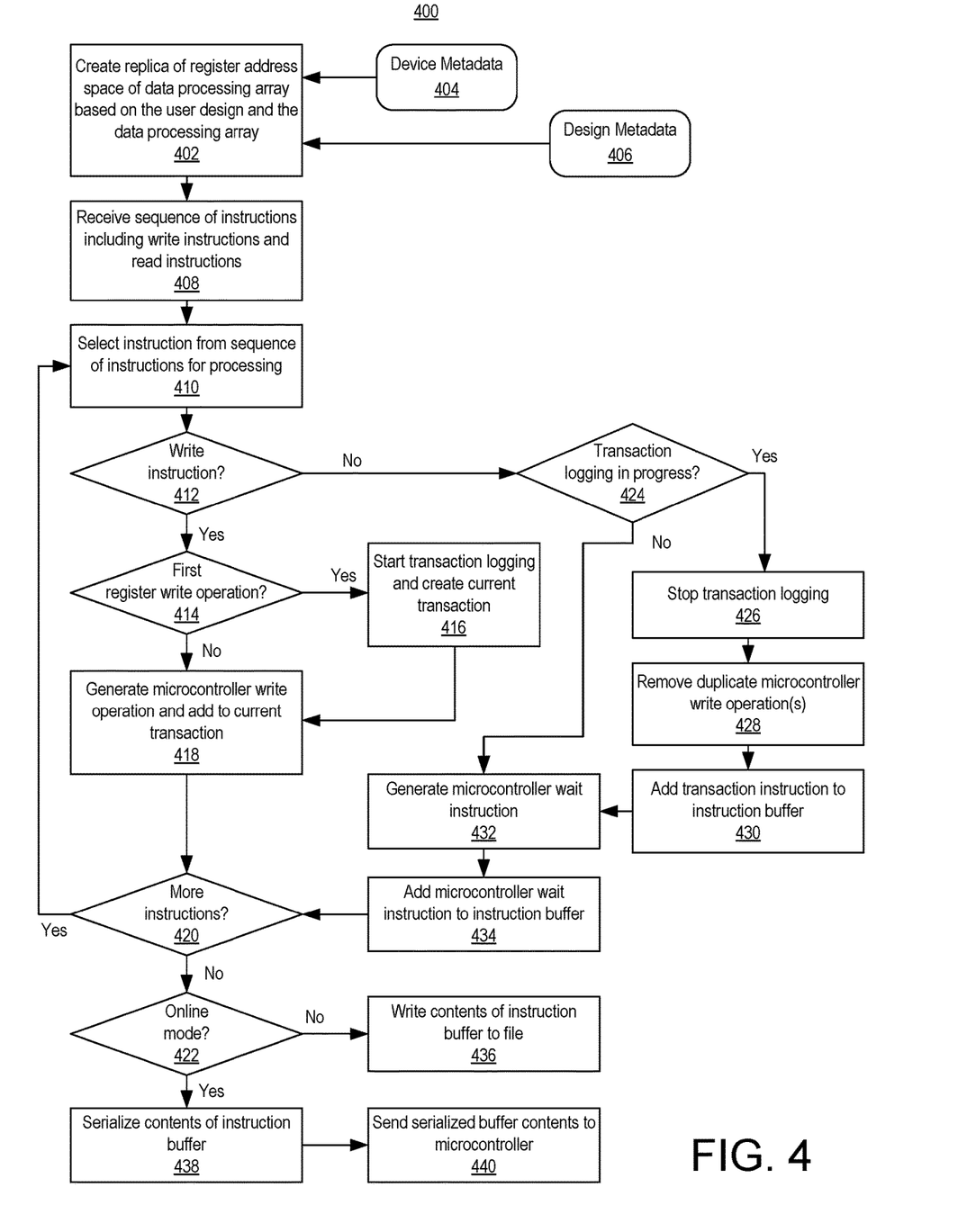
FIG. 4 illustrates an example method of translating buffer descriptor data into executable microcontroller instructions.

FIG. 4 illustrates an example method 400 of translating buffer descriptor data into executable microcontroller instructions. Method 400 may be performed by host system 102. For example, method 400 may be performed by CPU 104 of FIGS. 1 and 3. Method 400 illustrates a technique for generating instructions that are executable by microcontroller 110 for controlling data movement into and out from data processing array 112.

In the example, instruction(s) generated is/are offloaded from microcontroller 110 to CPU 104. CPU 104, being disposed in host system 102, typically has greater computational resources than microcontroller 110. As discussed, method 400 may be performed during compile time of the design (e.g., while the design is offline) or at runtime of the design in data processing array 112 (e.g., while the design is online).

In general, the example of FIG. 4 illustrates a process that includes receiving, in a host system, a sequence of instructions including write instructions and read instructions. The write instructions correspond to (e.g., specify) buffer descriptors. The buffer descriptors specify runtime data movements for a design for a particular data processing array. The host system creates a replica of a register address space of the data processing array based on the design and the data processing array. The write instructions are converted into transaction instructions and the read instructions are converted into wait instructions. The conversion may be performed based on the replica of the register address space. The transaction instructions and the wait instructions are included in an instruction buffer. The host system is capable of providing the instruction buffer to a microcontroller configured to execute the transaction instructions and the wait instructions to implement the runtime data movements for the design as implemented in the data processing array. In another aspect, the host system is capable of storing the instruction buffer to a file for subsequent execution by the microcontroller.

Method 400 may begin in block 402 where CPU 104 creates a replica of the register address space of data processing array 112 based on the design and the data processing array 112. CPU 104 is capable of generating the replica of the register address space of data processing array 112 by loading and initializing device metadata 404 and design metadata 406. The replica generated by CPU 104 may include only a portion of the register address space of data processing array 112. For example, the replica may include only the portion of the register address space of data processing array 112 as defined by device metadata 404 that is actually used by the design per design metadata 406.

Device metadata 404 provides a description of the particular version of the data processing array 112 implemented in the target IC in which the design is to be executed. For example, the device metadata 404 may specify the architecture of the data processing array 112 and the absolute addresses for the various components (e.g., DMA circuits 302) included in data processing array 112. For purposes of illustration, device metadata 404, in defining the architecture of data processing array 112, is capable of specifying a number of compute tiles and/or memory tiles included in the data processing array 112, and a number of tiles included in the array interface of data processing array 112. The device metadata 404 may specify the DMA circuits included in the various tiles of data processing array 112. The architecture of the data processing array 112, as defined by the device metadata 404 may also specify the available input ports and the available output ports of data processing array 112. As noted, the device metadata 404 also can specify the absolute addresses for the various components (e.g., cores, memories, DMA circuits, configuration registers, etc.) of the data processing array 112.

Design metadata 406 specifies the particular tiles of data processing array 112 that are used by the design. For example, device metadata 404 may specify that data processing array 112 is formed of a 4×5 grid of compute tiles. The design, however, may only utilize a portion of the available data processing array 112. For example, the design may use only the top two rows of compute tiles. Design metadata 406 specifies which particular tiles and components of tiles are being utilized by the design. In this regard, the replica of the register address space of data processing array 112 need only include the portions of the register address space of data processing array 112 utilized by the design per the design metadata 406.

Listing 1 includes example source code that may be executed by CPU 104 to perform the operations described in connection with block 402. Creation of the replica in host system 102 facilitates the logging of transactions to be described in greater detail hereinbelow, the processing of read instructions, and the detection of duplicate microcontroller write operations. In Listing 1, the file "libaie_control.so" may include the design metadata 406. The device metadata 404 may be stored within host system 102 and accessed by CPU 104.

Listing 1

```
op_buf ibuf;
deviceHandle h("./libaie_control.so", NUM_GMIO );
```

In block 408, CPU 104 receives a sequence of instructions. The sequence of instructions includes write instructions and read instructions. The sequence of instructions may be generated by a compiler executing in host system 102 or another data processing system as part of compiling the design for data processing array 112. Each write instruction included in the sequence of instructions specifies, at a high level, a buffer descriptor. For example, the buffer descriptor specified by a write instruction defines the various parameters of the buffer descriptor albeit in a human readable format. The human readable format of the buffer descriptor, as generated by the compiler, may not be directly executed or operated on by microcontroller 110 for controlling data movement in and out of data processing array 112.

In one aspect, the sequence of instructions may be received from a compilation process operating on the design for data processing array 112. In that case, the sequence of instructions may be received by CPU 104 as such instructions are generated by the compilation process.

In another aspect, the sequence of instructions may be obtained from a file. That is, the sequence of instructions may have been previously generated and stored in a file for subsequent processing by CPU 104. Once the replica of the register address space of data processing array 112 is generated within host system 102, any existing instructions (e.g., those obtained from a file) can be preloaded for processing.

Having created the replica, method 400 may begin an iterative process that adds transaction instructions and microcontroller wait instructions to an instruction buffer.

In block 410, CPU 104 selects an instruction from the sequence of instructions for processing. In block 412, CPU 104 determines whether the selected instruction is a write instruction. In response to determining that the selected instruction is a write instruction, method 400 continues to block 414.

In block 414, CPU 104 determines whether the write instruction is the first write instruction. For example, CPU 104 determines whether the write instruction is the first write instruction of a set of one or more consecutive write instructions that may be included in a single transaction. In response to determining that the write instruction is the first, method 400 continues to block 416. In block 416, CPU 104 starts transaction logging and creates a current transaction. The transaction serves as a container for storing microcontroller write operations that are to be generated. In response to determining that the write instruction is not the first, method 400 continues to block 418. In the case where the write instruction is not the first, transaction logging has already been started by virtue of operating on a prior write instruction that was determined to be the first of a series of consecutive write instructions. Further, a current transaction has already been created.

In block 418, CPU 104 generates a microcontroller write operation from the write instruction. As discussed, an example of a write instruction creates or defines a buffer descriptor for programming DMA circuits 302 in data processing array 112. The buffer descriptor is a mechanism used to describe the pattern of data movement between different components in data processing array 112.

In general, CPU 104 converts the write instructions into transaction instructions. This operation can include, as part of block 418, generating a microcontroller write operation for each write instruction. Each microcontroller write operation includes, or may be specified as, one or more address-value pairs. For example, CPU 104 is capable of parsing the write instruction, performing address translation of one or more addresses specified by the write instruction, and encoding the buffer descriptor specified by the microcontroller write operation as one or more address-value pairs.

Listing 2 includes example source code that may be executed by CPU 104 to implement block 418 of FIG. 4. In the example, parameters of the buffer descriptor such as size, offset, length, and stepsize are determined from the selected write command. The address to which the buffer descriptor is to point (e.g., the address where the data is stored in device memory 106) is determined from the write instruction and stored in input_boprop.paddr_. The particular DMA circuit to which the buffer descriptor is to be provided is specified by the write command as an index, which is "0" in this example.

Listing 2

```
buffer_descriptor_parameters bd;
bd.offset = 0;
bd.length = 36;
bd.stepsize = {1,10,3};
bd.wrap = {3,6}
auto driverStatus = h.DMAEnqueueBD( 0,
                                    (void*) ( input_boprop.paddr_),
                                    {buffer_descriptor(bd)});
```

The DMAEnqueueBD Application Programming Interface (API) of Listing 2 is capable of encoding the buffer descriptor as one or more address-value pairs. The address of the address-value pair specifies the address of the particular DMA circuit 302 to which the buffer descriptor is to be provided for configuration during runtime. In this example, the index of the DMA circuit 302 is "0" as specified in line 6. CPU 104 uses the replica of the register address space to translate the index into the address of the DMA circuit 302. The value portion of the address-value pair is generated by CPU 104 in executing the DMAEnqueueBD API by encoding the various parameters of the buffer descriptor (e.g., size, offset, length, and stepsize) into binary data. CPU 104, in executing the DMAEnqueueBD API, may perform any necessary address translation of the address stored in input_boprop.paddr_ and encode the resulting physical address into the value as binary data.

In the example of Listing 2, the DMAEnqueueBD API adds, or logs, the generated microcontroller write operation (e.g., one or more address-value pairs) to the current transaction. The data may be part of an ongoing transaction that includes multiple microcontroller write operations. In the case where a transaction includes a plurality of microcontroller write operations, the example source code illustrated in Listing 2 may be repeated.

In block 420, CPU 104 determines whether there are more instructions from the sequence of instructions to process. In response to determining that there are more instructions in the sequence of instructions to process, method 400 loops back to block 410 to select a next instruction to process. In response to determining that no further instructions of the sequence of instructions remain to be processed, method 400 continues to block 422.

Referring to block 412, in the case where CPU 104 determines that the selected instruction is not a write instruction (e.g., the selected instruction is a read instruction), method 400 continues to block 424. In block 424, CPU 104 determines whether transaction logging is in progress (e.g., is active). In response to determining that transaction logging is active, method 400 continues to block 426. In response to determining that transaction logging is not active, method 400 proceeds to block 432.

In block 426, CPU 104 stops transaction logging. Transaction logging is stopped in response to the selected instruction being determined to be a read instruction. The occurrence of a read instruction signifies an end of the current transaction. Block 426 effectively closes the current transaction. Closing the current transaction means that transaction logging is stopped and that no further microcontroller write operations are to be added to the current transaction.

In block 428, CPU 104 is capable of removing any duplicate microcontroller write operations from the current transaction. For example, CPU 104 is capable of comparing each microcontroller write operation of the current transaction with the microcontroller write operations of any transaction instructions that have been stored in the instruction buffer.

As discussed, each microcontroller write operation may include an address-value pair. For each microcontroller write operation in the current transaction, CPU 104 is capable of comparing the address-value pair(s) with the address-value pairs already included in the instruction buffer 304. In response to determining that an address-value pair of the current transaction matches an address-value pair of instruction buffer 304 (e.g., the address-value pair of the current transaction is the same as an address value pair of the instruction buffer), CPU 104 determines that the microcontroller write operation is unnecessary, e.g., is a duplicate, since the microcontroller write operation of the current transaction would write data to a location in the register address space of data processing array 112 that is identical to the data already stored at that location. More particularly, a duplicate would only re-write configuration data to a particular DMA circuit that has already been configured with that same data by virtue of a prior write thereby rendering the write of the current transaction unnecessary. Accordingly, CPU 104 removes any such duplicate microcontroller write operations (e.g., address-value pair(s)) from the current transaction.

The extra compute power available on CPU 104 allows for one or more optimizations such as duplicate removal in situations where multiple transactions are queued. For purposes of illustration, consider an example in which a given neural network layer require changing the configuration of some of the DMA circuits 302, but not all of such DMA circuits 302. If a current transaction holds the exact same address/value pair that already exists as the current configuration state set by a prior transaction, then the address-value pair of the current transaction can be skipped (e.g., removed) because the address-value pair is redundant. Tracking the global configuration state of the data processing array and performing optimizations as described herein using only microcontroller 110 would not be possible given the limited computational resources of microcontroller 110.

The transaction format used herein to generate transaction instructions allows CPU 104 to read, write, and reorder operations during one or more different optimization passes. The transaction format may be considered by CPU 104 as an intermediate representation (IR) by different stages spanning compilation and runtime. For example, a reorder scheduler may be executed that is configured to leverage the compute capability of CPU 104 to relieve microcontroller 110 from decision making required to perform scheduling. Such an optimization can be beneficial to networks with dependency nodes, wherein independent nodes can be scheduled out-of-order on available compute tiles within data processing array 112 while the dependent nodes can be scheduled in-order. A convolutional neural network is an example of a dependent graph. Natural Language Processing (NLP) networks such as Transformers, Bidirectional Encoder Representations from Transformers (BERT), and Multilayer Perceptron (MLP) networks including Deep Learning Recommendation Models (DLRM), however, can take advantage of out-of-order scheduling of transactions for lower latency. The transaction format described herein provides a compiler and network agnostic technique to enable such a schedule.

In block 430, CPU 104 adds the current transaction to instruction buffer 304 as a transaction instruction. Instruction buffer 304 is maintained in host system 102. Instruction buffer 304 is capable of storing or accumulating one or more transaction instructions and one or more wait instructions. Referring to block 430, once all of the DMA configuration operations (e.g., microcontroller write operations) are logged into the current transaction, the transaction is exported to the instruction buffer as a transaction instruction. The transaction instruction may include additional data such as an opcode indicating that the data structure is a transaction instruction to microcontroller 110.

Continuing with block 432, CPU 104 generates a microcontroller wait instruction from the selected instruction, which is a read instruction. In block 434, CPU 104 adds the microcontroller wait instruction to instruction buffer 304. After block 434, method 400 continues to block 420.

Referring to the example source code of Listing 3, the first line discontinues the transaction logging. The second line writes the current transaction to the instruction buffer as a transaction instruction (e.g., block 430). The third and fourth lines of Listing 3 illustrate the writing of generated wait instructions (e.g., block 434). The transaction instructions are executable by microcontroller 110 to configure the DMA circuits of the data processing array. That is, the transaction instructions are executable by microcontroller 110 to write configuration data to selected DMA circuits to effectuate the movement of data. The transaction instructions do not specify how or where to fetch the output data generated by the data processing array. The wait instructions specify how and where to retrieve data generated by data processing array 112.

Listing 3

```
XAie_TxnInst * TxnInst = h.getTransaction( );
ibuf.addOP( xdma_transaction ( TxnInst ));
ibuf.addOP( xdma_wait ( h.getShim(2) ));
ibuf.addOP( xdma_wait ( h.getShim(3) ));
```

Continuing with block 422, CPU 104 determines whether the current operating mode is online. That is, CPU 104 determines whether the design is currently executing in data processing array 112. In response to determining that the current mode is offline (e.g., not online), method 400 continues to block 436 where CPU 104 writes the content of instruction buffer 304 to a file. The file may be stored in a memory and recalled at a later time by providing the contents thereof to microcontroller 110 for playback (e.g., execution).

In response to determining that the current operation mode is online, method 400 continues to block 438 where CPU 104 serializes the contents of instruction buffer 304. In block 440, CPU 104 sends the serialized buffer contents to microcontroller 110 for execution. For example, when all of the instructions of the sequence of instruction have been accumulated in instruction buffer 304, CPU 104 may then serialized the contents of instruction buffer 304 and send serialized data to microcontroller 110 via one or more driver calls. The example source code of Listing 4 illustrates the sending of the serialized buffer contents to microcontroller 110 for execution to perform DMA circuit configuration.

---
Listing 4
---
```
xclemuBufferHandle instr_h = xrtemu_client.xclAllocBO(ibuf.size( )));
xrtemu_client.xclWriteBO(instr_h, (void*)(ibuf.data( )), ibuf.size( ), 0);
```
---

In the examples described herein, the various write instructions and read instructions are distilled into transaction instructions and wait instructions. This means that there are only two types of instructions needed for moving data into and out from data processing array 112. Further, microcontroller 110 need only execute sufficient program code that is capable of executing these two different types of instructions. In consequence, the program code executed by microcontroller 110 may be streamlined so as to execute or replay only these two types of instructions. For example, the program code executed by microcontroller 110 may be streamlined so as to only execute the transaction instruction and the wait instruction described herein.

The source code of Listing 5 illustrates an example of the program code that may be executed by microcontroller 110. The source code of Listing 5 illustrates nearly the entirety of the program code that may be executed by microcontroller 110. Some portions of the program code such as definitions of the data structures shown and some program code that deciphers which function to call is omitted. In Listing 5, using the transaction and wait instruction pair reduces the number of distinct instructions that need to be interpreted. With other conventional microcontrollers, the number of instructions to be interpreted is significantly larger requiring greater computational effort in parsing each instruction and invoking the different functions specified by each instruction.

In the example of Listing 5, a function for the transaction instruction and a function for the wait instruction are specified. For example, the function XAie_DmaWaitForDone may be used to execute the wait instruction. The function XAie_DmaWaitForDone is capable of polling data processing array 112 to determine when a result is ready. The function XAie_SubmitTransaction may be used to execute the transaction instruction. The function XAie_SubmitTransaction is capable of processing all the address-value pairs of the transaction instruction for correct DMA configuration.

The inventive arrangements provide advantages over more complex instruction set architectures usable by a microcontroller for controlling a data processing array. More complex instruction set architectures include a larger number of different opcodes, greater complexity in the program code executed by the microcontroller to handle and execute the various opcodes. That is, the microcontroller would require program code for evaluating each instruction that is supported and a routine specific to the opcode to execute or implement that instruction. In cases where the microcontroller has limited computational capabilities, execution of instructions conforming to a more complex instruction set architecture may cause the microcontroller to restrict performance of the data processing array in that the microcontroller is unable to keep up with the data movement requirements of the data processing array.

As discussed, reduction of the instructions down to the examples described herein reduces the size and complexity of the program code executed by the microcontroller. This can be beneficial particularly in cases where the microcontroller has limited memory available for storing the operational program code. In cases where the size of the operational program code exceeds the size of the available memory of the microcontroller, performance of the microcontroller may be reduced significantly, which may cause a drop in performance of the data processing array.

Microcontroller 110 is capable of executing the transaction instructions and wait instructions, as provided from host system 102, to configure one or more DMA circuits of data processing array 112 to move data into data processing array 112 and read data from data processing array 112. Microcontroller 110, in executing the instructions, effectively programs the DMA circuits 302 to move data in and out of data processing array 112 during runtime of the design.

Figure 5:
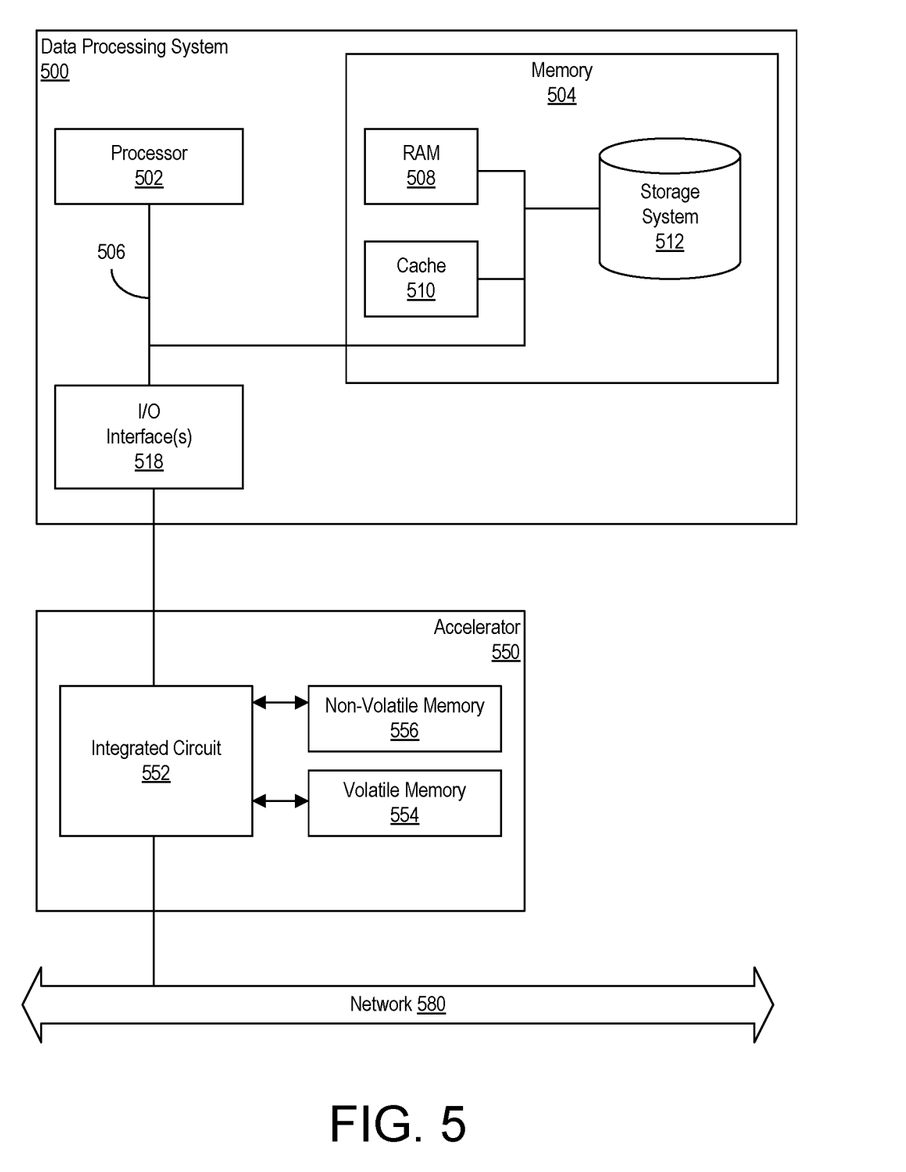
FIG. 5 illustrates an example computing system in which the inventive arrangements may be implemented.

FIG. 5 illustrates an example computing system in which the inventive arrangements may be implemented. As shown, the example computing system includes a data processing system 500. As defined herein, the term "data processing system" means one or more hardware systems configured to process data, each hardware system including at least one processor and memory, wherein the processor is programmed with computer-readable instructions that, upon execution, initiate operations. Data processing system 500 can include a processor 502, a memory 504, and a bus 506 that couples various system components including memory ---
Listing 5
---
```
static inline u8 convertLogicalToPhysicalDMAChNum(short logicalChNum)
{
  return (logicalChNum >1 ? (logicalChNum - 2) : logicalChNum);
}
int op_XDMA_WAIT_func(XAie_DevInst * devInst , op_base * ptr)
{
  xdma_wait_t * instr = (xdma_wait_t*) ptr;
  while (XAie_DmaWaitForDone(devInst, instr->tileLoc,
    convertLogicalToPhysicalDMAChNum(instr->channelNum), instr->
    dma_direction, 0) != XAEI_OK);
  return 0;
}
Int op_XDMA_TRANSACTION_func(XAie_DevInst* devinst , op_base * ptr)
{
  xdma_transaction_t * instr = (xdma_transaction_t*) ptr;
  instr->txn.CmdBuf = (XAie_TxnCmd*) ( (char*)ptr + sizeof(xdma_transaction_t)
  );
  XAie_SubmitTransaction(devInst, &instr->txn);
}
```

504 to processor 502. Data processing system 500 is an example implementation of host system 102.

Processor 502 may be implemented as one or more processors. In an example, processor 502 is implemented as a CPU (e.g., CPU 104). Processor 502 may be implemented as one or more circuits capable of carrying out instructions contained in program code. The circuit may be an integrated circuit or embedded in an integrated circuit. Processor 502 may be implemented using a complex instruction set computer architecture (CISC), a reduced instruction set computer architecture (RISC), a vector processing architecture, or other known architectures. Example processors include, but are not limited to, processors having an x86 type of architecture (IA-32, IA-64, etc.), Power Architecture, ARM processors, and the like.

Bus 506 represents one or more of any of a variety of communication bus structures. By way of example, and not limitation, bus 506 may be implemented as a PCIe bus. Data processing system 500 typically includes a variety of computer system readable media. Such media may include computer-readable volatile and non-volatile media and computer-readable removable and non-removable media.

Memory 504 can include computer-readable media in the form of volatile memory, such as random-access memory (RAM) 508 and/or cache memory 510. Data processing system 500 also can include other removable/non-removable, volatile/non-volatile computer storage media. By way of example, storage system 512 can be provided for reading from and writing to a non-removable, non-volatile magnetic and/or solid-state media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 506 by one or more data media interfaces. Memory 504 is an example of at least one computer program product.

Memory 504 is capable of storing computer-readable program instructions that are executable by processor 502. For example, the computer-readable program instructions can include an operating system, one or more application programs, other program code, and program data. Processor 502, in executing the computer-readable program instructions, is capable of performing the various operations described herein that are attributable to a computer and, for example, to CPU 104. It should be appreciated that data items used, generated, and/or operated upon by data processing system 500 are functional data structures that impart functionality when employed by data processing system 500.

As defined within this disclosure, the term "data structure" means a physical implementation of a data model's organization of data within a physical memory. As such, a data structure is formed of specific electrical or magnetic structural elements in a memory. A data structure imposes physical organization on the data stored in the memory as used by an application program executed using a processor.

Data processing system 500 may include one or more Input/Output (I/O) interfaces 518 communicatively linked to bus 506. I/O interface(s) 518 allow data processing system 500 to communicate with one or more external devices. Examples of I/O interfaces 518 may include, but are not limited to, network cards, modems, network adapters, hardware controllers, etc. Examples of external devices include devices that allow a user to interact with data processing system 500 (e.g., a display, a keyboard, and/or a pointing device) and/or other devices such as accelerator 550. Accelerator 550 may be configured to communicate over one or more optional networks such as network 580. In the example, via I/O interface(s) 518, data processing system 500 may convey transaction instructions and wait instructions as described herein to accelerator 550 and IC 552. Network 580 may be a local area network (LAN) or a wide area network (WAN). For example, network 580 may be an Ethernet network. In another example, network 580 may be a public network such as the Internet.

Data processing system 500 is only one example implementation. Data processing system 500 can be practiced as a standalone device (e.g., as a user computing device or a server, as a bare metal server), in a cluster (e.g., two or more interconnected computers), or in a distributed cloud computing environment (e.g., as a cloud computing node) where tasks are performed by remote processing devices that are linked through a communications network. In a distributed cloud computing environment, program modules may be located in both local and remote computer system storage media including memory storage devices.

In an example implementation, I/O interface 518 may be implemented as a PCIe adapter. Data processing system 500 and accelerator 550 communicate over a communication, e.g., a PCIe communication channel. Accelerator 550 may be implemented as a circuit board that couples to data processing system 500. Accelerator 550 may, for example, be inserted into a card slot, e.g., an available bus and/or PCIe slot, of data processing system 500.

Accelerator 550 may include an IC 552. Accelerator 550 also may include a volatile memory 554 coupled to IC 552 and a non-volatile memory 556 also coupled to IC 552. Volatile memory 554 may be implemented as a RAM. Volatile memory 554 is an example of device memory 106. As noted, device memory 106 may be included within IC 552 in some cases. Non-volatile memory 556 may be implemented as flash memory.

IC 552 may be implemented as any of a variety of different types of ICs. For example, IC 552 may be implemented as a System-on-Chip (SoC), an adaptive IC, a Field Programmable Gate Array, an Application-Specific IC (ASIC), or the like. An adaptive IC is an IC that may be updated subsequent to deployment of the device into the field. The adaptive IC may be optimized, e.g., configured or reconfigured, for performing particular operations after deployment. The optimization may be performed repeatedly over time to meet different requirements or needs. In the example, IC 552 includes a data processing array 112.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

As defined herein, the singular forms "a," "an," and "the" are intended to include the plural forms as well, unless the context clearly indicates otherwise.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without human intervention. As defined herein, the term "user" means a human being.

As defined herein, the term "computer-readable storage medium" means a storage medium that contains or stores program instructions for use by or in connection with an instruction execution system, apparatus, or device. As defined herein, a "computer-readable storage medium" is not a transitory, propagating signal per se. The various forms of memory, as described herein, are examples of computer-readable storage media. A non-exhaustive list of examples of computer-readable storage media include an electronic storage device, a magnetic storage device, an optical storage device, an electromagnetic storage device, a semiconductor storage device, or any suitable combination of the foregoing. A non-exhaustive list of more specific examples of a computer-readable storage medium may include: a portable computer diskette, a hard disk, a RAM, a read-only memory (ROM), an erasable programmable read-only memory (EPROM or Flash memory), an electronically erasable programmable read-only memory (EEPROM), a static random-access memory (SRAM), a portable compact disc read-only memory (CD-ROM), a digital versatile disk (DVD), a memory stick, a floppy disk, or the like.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "responsive to" and similar language as described above, e.g., "if," "when," or "upon," means responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, the term "real-time" means a level of processing responsiveness that a user or system senses as sufficiently immediate for a particular process or determination to be made, or that enables the processor to keep up with some external process.

As defined herein, the term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

A computer program product may include a computer-readable storage medium (or media) having computer-readable program instructions thereon for causing a processor to carry out aspects of the inventive arrangements described herein. Within this disclosure, the term "program code" is used interchangeably with the term "program instructions." Computer-readable program instructions described herein may be downloaded to respective computing/processing devices from a computer-readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object-oriented programming language and/or procedural programming languages. Computer-readable program instructions may include state-setting data. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer-readable program instructions by utilizing state information of the computer-readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer-readable program instructions, e.g., program code.

These computer-readable program instructions may be provided to a processor of a computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the operations specified in the flowchart and/or block diagram block or blocks.

The computer-readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

What is claimed is:

1. A method, comprising:
   creating a replica of a register address space of a data processing array based on a design and the data processing array;
   receiving a sequence of instructions including write instructions and read instructions, wherein the write instructions correspond to buffer descriptors specifying runtime data movements for a design for the data processing array;
   converting the write instructions into transaction instructions and the read instructions into wait instructions based on the replica of the register address space;
   including the transaction instructions and the wait instructions in an instruction buffer; and
   performing at least one of providing the instruction buffer to a microcontroller configured to execute the transaction instructions and the wait instructions to implement the runtime data movements for the design as implemented in the data processing array or storing the instruction buffer to a file for subsequent execution by the microcontroller.

2. The method of claim 1, wherein the converting the write instructions into transaction instructions comprises generating a microcontroller write operation for each write instruction.

3. The method of claim 2, wherein the generating the microcontroller write operation for each write instruction comprises:
   parsing the write instruction, performing address translation of an address specified by the write instruction, and encoding a buffer descriptor specified by the microcontroller write operation as one or more address-value pairs.

4. The method of claim 2, wherein each microcontroller write operation includes one or more address value pairs.

5. The method of claim 1, wherein the converting the write instructions into transaction instructions comprises:
   in response to a first write instruction, initiating transaction logging by creating a current transaction;
   generating a microcontroller write operation for each write instruction and adding the microcontroller write operation to the current transaction;
   closing the current transaction in response to receiving a first read instruction subsequent to creation of the current transaction; and
   adding the current transaction to the instruction buffer.

6. The method of claim 5, further comprising:
   generating a wait instruction for the first read instruction; and
   adding the wait instruction to the instruction buffer.

7. The method of claim 1, wherein the microcontroller, in executing the transaction instructions and the wait instructions, configures one or more direct memory access circuits of the data processing array to move data into the data processing array and read data from the data processing array.

8. The method of claim 1, further comprising:
   checking for duplicate microcontroller write operations; and
   in response to detecting a duplicate microcontroller write operation, removing the duplicate microcontroller write operation from a current transaction prior to adding the current transaction to the instruction buffer as a transaction instruction.

9. A system, comprising:
   a memory configured to store computer-readable program instructions; and
   one or more processors configured to initiate operations in response to executing the computer-readable program instructions, wherein the operations include:
   creating a replica of a register address space of a data processing array based on a design and the data processing array;
   receiving a sequence of instructions including write instructions and read instructions, wherein the write instructions correspond to buffer descriptors specifying runtime data movements for a design for the data processing array;
   converting the write instructions into transaction instructions and the read instructions into wait instructions based on the replica of the register address space;
   including the transaction instructions and the wait instructions in an instruction buffer; and
   performing at least one of providing the instruction buffer to a microcontroller configured to execute the transaction instructions and the wait instructions to implement the runtime data movements for the design as implemented in the data processing array or storing the instruction buffer to a file for subsequent execution by the microcontroller.

10. The system of claim 9, wherein the converting the write instructions into transaction instructions comprises generating a microcontroller write operation for each write instruction.

11. The system of claim 10, wherein the generating the microcontroller write operation for each write instruction comprises:
   parsing the write instruction, performing address translation of an address specified by the write instruction, and encoding a buffer descriptor specified by the microcontroller write operation as one or more address-value pairs.

12. The system of claim 10, wherein each microcontroller write operation includes one or more address value pairs.

13. The system of claim 9, wherein the converting the write instructions into transaction instructions comprises:
   in response to a first write instruction, initiating transaction logging by creating a current transaction;
   generating a microcontroller write operation for each write instruction and adding the microcontroller write operation to the current transaction;
   closing the current transaction in response to receiving a first read instruction subsequent to creation of the current transaction; and
   adding the current transaction to the instruction buffer.

14. The system of claim 13, wherein the one or more processors are configured to initiate operations further comprising:
   generating a wait instruction for the first read instruction; and
   adding the wait instruction to the instruction buffer.

15. The system of claim 9, wherein the microcontroller, in executing the transaction instructions and the wait instructions, configures one or more direct memory access circuits of the data processing array to move data into the data processing array and read data from the data processing array.

16. The system of claim 9, wherein the one or more processors are configured to initiate operations further comprising:
   checking for duplicate microcontroller write operations; and
   in response to detecting a duplicate microcontroller write operation, removing the duplicate microcontroller write operation from a current transaction prior to adding the current transaction to the instruction buffer as a transaction instruction.

17. A system, comprising:
   a central processing unit configured to translate a sequence of instructions including write instructions and read instructions into a plurality of transaction instructions and microcontroller wait instructions;
   a microcontroller; and
   a data processing array coupled to the microcontroller;
   wherein the central processing unit is configured to provide the plurality of transaction instructions and wait instructions to the microcontroller; and
   wherein the microcontroller, in response to receiving the plurality of transaction instructions and wait instructions, is configured to execute the plurality of transaction instructions and wait instructions to control data movements into and out from the data processing array.

18. The system of claim 17, wherein the microcontroller, in executing the plurality of transaction instructions and wait instructions, configures one or more direct memory access circuits of the data processing array to move data into the data processing array and read data from the data processing array.

19. The system of claim 17, wherein the central processing unit is configured to generate the plurality of transaction instructions and wait instructions by converting the write instructions into the plurality of transactions instructions, wherein the converting comprises:
   in response to a first write instruction, initiating transaction logging by creating a current transaction;
   generating a microcontroller write operation for each write instruction and adding the microcontroller write operation to the current transaction; and
   closing the current transaction in response to receiving a first read instruction subsequent to creation of the current transaction; and
   adding the current transaction to an instruction buffer.

20. The system of claim 19, wherein the central processing unit is configured to initiate operations further comprising:
   generating a wait instruction for the first read instruction; and
   adding the wait instruction to the instruction buffer.

* * * * *